United States Patent [19]

Nalven

[11] Patent Number: 4,660,506

[45] Date of Patent: Apr. 28, 1987

[54] PET TOILET

[76] Inventor: Eric F. Nalven, 330 Monroe Ave., Wyckoff, N.J. 07481

[21] Appl. No.: 780,413

[22] Filed: Sep. 26, 1985

[51] Int. Cl.⁴ .......................................... A01K 29/00
[52] U.S. Cl. ........................................................ 119/1
[58] Field of Search ............................ 119/1, 158, 159

[56] References Cited

U.S. PATENT DOCUMENTS

| | | | |
|---|---|---|---|
| 1,813,329 | 7/1931 | Supplee | 119/1 |
| 2,584,656 | 2/1952 | Anderson | 119/1 |
| 2,661,865 | 12/1953 | Wendt | 119/158 X |
| 3,747,563 | 7/1973 | Brockhouse | 119/1 |
| 3,817,213 | 6/1974 | Chalmers | 119/1 |
| 3,842,803 | 10/1974 | Temel | 119/1 |
| 3,871,331 | 3/1975 | Breau | 119/1 |
| 3,921,582 | 11/1975 | Sedlmeir | 119/1 |
| 3,964,437 | 6/1976 | Brown | 119/1 |
| 4,011,836 | 3/1977 | Temel | 119/1 |
| 4,098,229 | 7/1978 | Haynes et al. | 119/1 |
| 4,117,555 | 10/1978 | Dennis | 4/1 |
| 4,196,693 | 4/1980 | Unversaw | 119/1 |
| 4,228,554 | 10/1980 | Tumminaro | 119/1 |
| 4,242,763 | 1/1981 | Walker | 119/1 |
| 4,262,634 | 4/1981 | Piccone | 119/1 |

FOREIGN PATENT DOCUMENTS 00458  7/1979  PCT Int'l Appl. ...................... 119/1

Primary Examiner—Robert P. Swiatek
Attorney, Agent, or Firm—Mandeville & Schweitzer

[57] ABSTRACT

A pet toilet for use indoors having an automatic cleaning feature. The pet toilet is attached to conventional household drains. The animal stands or sits on a flexible foraminous platform, thereby deflecting it, and relieves itself. Some of the waste passes through the holes in the platform. After the animal leaves, a sensor detects that the flexible platform has returned to its normal level and water is automatically introduced to a level above the level of the platform. An ultrasonic transducer emits ultrasonic waves which clear the platform and other areas of the toilet.

7 Claims, 3 Drawing Figures

PET TOILET

BACKGROUND OF THE INVENTION

With the enactment of laws in some localities requiring owners to remove from the streets and sidewalks solid wastes left by pets, the amount of distasteful work involved in keeping pets has increased. Moreover, the pet's need to relieve itself often comes at an inconvenient time for its owner. Therefore, a need exists for a convenient and effective toilet for pets which can be located within one's home and which can automatically clean itself.

There have been numerous previous attempts to develop devices suitable for use as a pet toilet. Brockhouse U.S. Pat. No. 3,747,563 discloses a toilet in which entry of an animal onto an upwardly biased treadle forces the treadle to a level position which, in turn, conditions a valve actuation arrangement for opening a control valve when the animal leaves. When the animals steps off of the toilet, the treadle returns to its upwardly inclined position whereby the control valve is opened and a large volume of water flow flushes down the treadle. The treadle is provided with a perforated plate which avoids spreading of urine on the treadle surface and consequent fouling of the animal's feet.

Walker U.S. Pat. No. 4,242,763 discloses a pet toilet having a microswitch-controlled endless rotatable belt onto which the pet relases its wastes. The belt is stationery when the animal is standing on it. The weight of the animal on the belt activates the microswitch and when the animal leaves the belt, the microswitch is further activated driving the belt one half cycle and opening a water valve. At the end of the half-cycle rotation the water valve is closed. Waste matter is scraped from the belt during rotation and the bottom portion of the belt (formerly the top portion) is submerged in chemically treated water. Water also washes down the enclosure walls and wets the top of the belt.

Unversaw U.S. Pat. No. 4,196,693 also discloses a pet toilet which involves use of a conveyor belt. When the pet moves onto the conveyor, the weight of the pet depresses one of the rollers which support the conveyor, together with a rod associated therewith. The movement of the rod closes a switch. When the pet leaves the conveyor, the switch opens and a time delay-to-flush mechanism is activated in a printed circuit timer board. After the time delay-to-flush cycle, the circuit timer board completes respective circuits to a valve causing the flushing circuit to activate and to a motor which effects movement of the conveyor. When the flush cycle has been completed, the circuit timer board causes the unit to reset to the "off" position.

Breau U.S. Pat. No. 3,871,331 discloses an animal litter disposal unit which comprises an enclosed housing with means for ingress and egress for an animal and a floor which comprises an endless belt onto which the animal releases its wastes. A scent attractive to the particular animal using the animal disposal unit can be introduced.

Temel U.S. Pat. No. 4,011,836 discloses a pet commode which includes control devices for automatically pivoting the floor on which waste products are deposited after a pet has left the commode. Apparently when leaving the commode the pet activates a relay by stepping on a plate associated with a capacitive sensor.

Other devices for disposal of animal wastes are disclosed in Piccone U.S. Pat. No. 4,262,634, Tumminaro U.S. Pat. No. 4,228,554, Dennis U.S. Pat. No. 4,117,555 (canine toilet including seat with perforations for urine), Sedlmeir U.S. Pat. No. 3,921,582, Brown U.S. Pat. No. 3,964,437 and Chalmers U.S. Pat. No. 3,817,213.

The object of the invention is a new improved pet toilet which is very convenient for use in the home and in which flushing and cleaning are carried out effectively and automatically.

SUMMARY OF THE INVENTION

The invention comprises a pet toilet which may be readily attached to conventional household drains and in which the cleaning of the waste materials left by the animal is performed effectively and automatically at the appropriate time by an ultrasonic transducer. The toilet includes a flexible foraminous platform on which the animal stands and upon which it deposits its wastes. The flexibility of the platform is important in that when the animal stands on the platform it is deflected to an extent due to the animal's weight and touches a sensor, which is activated thereby. When the animal leaves the toilet, the sensor detects the return of the platform to its normal position and the flushing-cleaning cycle is automatically triggered.

An important feature of the invention is the use of an ultrasonic transducer for effective and automatic cleaning of the waste material from the interior of the toilet, particularly the platform. This is accomplished by creating a reservoir of liquid which extends above the platform after the animal has left the toilet. The ultrasonic transducer creates ultrasonic waves which act to clean the surfaces within the reservoir which may be soiled by the animal, including the platform, the walls of the toilet and the floor. The flexible platform is foraminous so that the animal waste can pass through to a drain below.

The toilet of the invention may be connected to standard household drains such as a bathroom drain or to a conventional toilet. The pet toilet may be provided with means for subjecting the platform and other surfaces likely to be soiled with pressurized water, although this is not required. The toilet may also be provided with scenting agents and/or means for dispensing such agents for making the toilet more attractive to the animal.

DETAILED DESCRIPTION OF THE INVENTION

Figure 1:
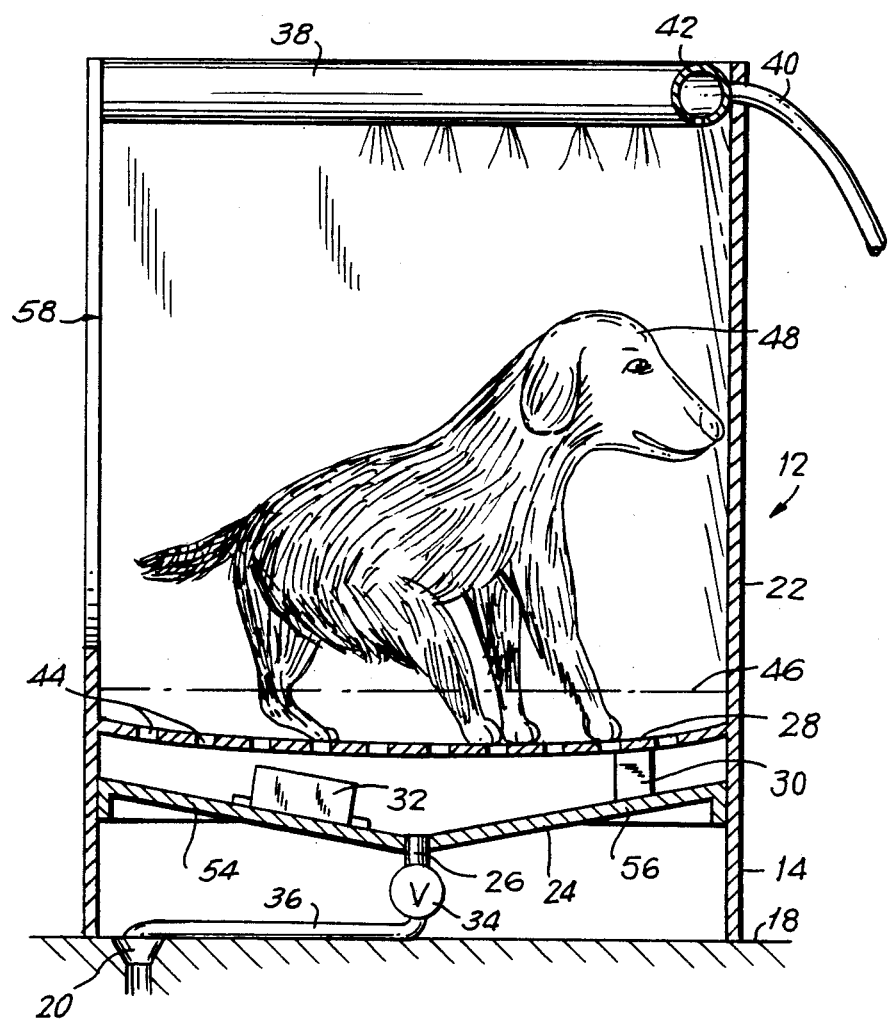
FIG. 1 is a cross-sectional view taken from the side of a toilet in accordance with the invention.
Figure 2:
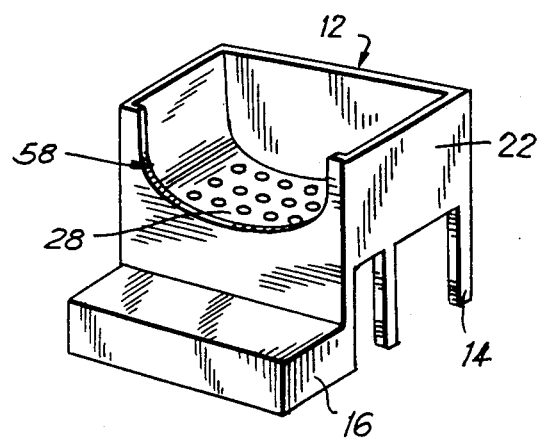
FIG. 2 is a perspective view of a toilet in accordance with the invention.
Figure 3:
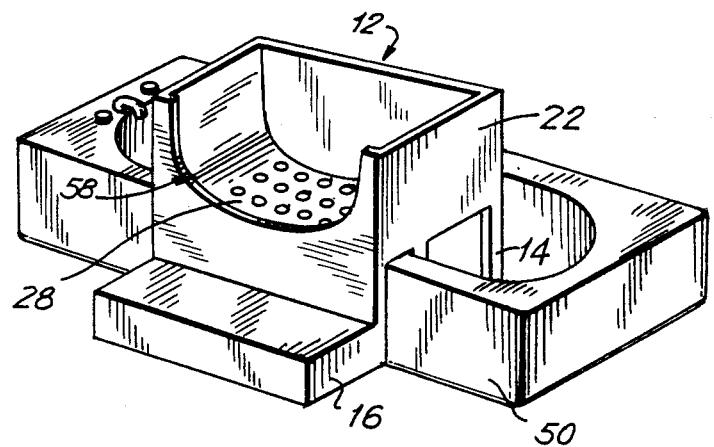
FIG. 3 is a perspective view of the toilet of the invention in place over a bathtub.

The pet toilet 12 is supported by legs 14 and may also be supported by step 16 as shown in FIGS. 2 and 3. As seen in FIG. 1, the legs extend from toilet floor 24 down to support surface 18, which can be the floor of a bathtub. Support surface 18 includes a drain 20. Walls 22 extend upwardly from toilet floor 24 and partially enclose the toilet. Access opening 58 in walls 22 permits the animal to enter the toilet.

Floor 24 includes 2 sections, 54 and 56, which slant downwardly to a drain opening 26. Perpendicular to the four walls 22 and secured thereto is platform 28, which extends generally parallel to surface 18 in the embodiments illustrated. Platform 28 is foraminous so that when the animal 48 relieves itself some of the waste passes through holes 44 in the platform. Platform 28 is also flexible: Sensor 30, which may be associated with floor 24 as illustrated or with wall 22, is positioned below platform 28 so that when the animal walks onto the platform, the platform is deflected and comes in contact with sensor 30.

Floor 24 and walls 22 define a reservoir suitable for containing liquid and solid matter when drain opening 26 is plugged. An ultrasonic transducer 32 is present in the reservoir associated with floor 24 as shown in FIG. 1. Valve 34 is located at or below drain opening 26 so that the opening may be closed at the appropriate time. Drainpipe 36 leads from valve 34 to drain 20 in support surface 18. Pipes 38 supply a cleansing liquid such as water, obtained from hose 40, to cleansing-liquid dispenser 42. In addition to water, scenting or cleaning agents may be introduced into the toilet by these or other means. Hose 40 leads to a supply of cleansing liquid (not illustrated).

Platform 28 is comprised of a flexible foraminous material from which animal wastes which have not passed through the holes to the floor below can be ultrasonically cleaned. Likewise, walls 22 and floor 24 are made of a material from which the animal wastes can be washed using the ultrasonic transducer.

In operation, the animal ascends step 16 and sits or stands on platform 28. The animal may be attracted to the toilet by fragrances, which may be mixed with the water or other cleansing liquid which is used to flush the system. Prior to and at the time that the animal steps onto platform 28, valve 34 is closed. Much of that portion of the reservoir extending between the floor 24 and platform 28 is filled with water or other cleaning liquid. As the animal steps onto the flexible platform, the platform is deflected and sensor 30 is activated. The animal then relieves itself. The animal's liquid wastes for the most part pass through holes 44 of platform 28 to the area below. Some of the solid waste may also pass through the holes of the platform.

When the animal has finished, it leaves the platform and descends down step 16. As the animal exits, the flexible platform 28 returns to its normal higher position thereby triggering sensor 30. Sensor 30 activates the flushing system so that shortly after the animal has left the toilet, water or other cleansing liquid is dispensed from dispenser 42. The dispenser may but need not, cause walls 22 and platform 28 to be subjected to a pressurized spray of water. Since valve 34 remains closed, as the water is released from dispenser 42 the level of water in the reservoir rises so that it is above the normal level of the platform. Water level 46 is shown in FIG. 1 to be above the lower (deflected) level of the platform; it will in fact exceed even the normal level of the platform. It is not expected that the water level in the reservoir will rise to above the level of the platform when the animal is present on the platform.

When water reaches a predetermined level or after a predetermined volume or period of water release, the transducer is automatically activated to emit ultrasonic waves which effect cleaning of the waste material from the floor, the platform and from those portions of the walls which are located at or below the water level. Accordingly, the predetermined water level in the reservoir during ultrasonic cleaning is set at such a level that any residual waste on the walls of the toilet will be removed by the action of the transducer.

The maximum level which the water in the reservoir is to attain can be largely preset by predetermining the amount of water to be released or by placement of sensors on the walls of the toilet. In the former case the level will be increased by the animal's wastes and this must be taken into account together with the maximum height of the reservoir to ensure that the toilet does not overflow. The height of water sensors on the toilet wall may be manually adjusted. The flushing cycle is timed so that after a preset period of transducer operation, valve 34 opens to permit the water and waste material to flow through drainpipe 36 to drain 20. Drain 20 is an ordinary bathtub drain. Other conventional or non-conventional drains may be used or, alternatively, drainpipe 36 may lead into a conventional or other toilet.

When the water and waste material have drained, the water or other cleansing liquid may be replenished to a preset level below the lowest predicted level of the platform by dispenser 42 or other water-introducing means. Also, at this time, a scent may be introduced to make the toilet more attractive to the animal. The scent may be introduced together with water or separately. The level of water introduced after the flushing cycle should be such that when the animal 48 stands or sits on the platform 28 the water is not at such a level that it comes through the holes in the platform and wets the feet of the animal. Indeed, there should be sufficient room between the level of water and the lowest level of the platform such that when the animal relieves itself the additional volume caused by liquid and/or solid wastes does not cause the level of liquid in the reservoir to go above the platform and thereby wet the animal and/or soil it with its own wastes. The level of postflushing water can be monitored and controlled in ways discussed in connection with the flushing water.

While it is preferred to release water into the tank with sufficient force to assist in the cleaning, this may not be necessary in that the transducer may be adequate to clean the excess waste material off of the walls, the platform and the floor. The means for releasing water into the toilet may therefore include nozzles, holes in the pipe, or other pressurized or unpressurized means.

The toilet may be used for disposing of liquid and/or solid animal wastes. The toilet may be used for various animals, particularly dogs and cats.

As seen particularly in FIG. 3, the pet toilet may be placed above a bathtub 50. The toilet may stand independently above the bathtub or may rest atop the tub as illustrated in FIG. 3. The specific means for timing and other control of the flushing cycle will comprise circuits and materials known to those skilled in the art.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:
1. An animal toilet comprising:
 (a) platform means comprising a flexible foraminous material capable of supporting an animal,
 (b) floor means below said platform means and including a drain opening,
 (c) reservoir means for containing wastes and cleansing liquids extending from said floor means to above said platform means when said floor means drain opening is closed, (d) a sensor positioned for detection of deflection of the flexible platform resulting from an animal stepping onto or off of the flexible platform, and (e) ultrasonic transducer means for generating ultrasonic waves for cleaning objects in contact with liquid contained within said reservoir.

2. The animal toilet of claim 1 further comprising means for introducing a cleansing liquid into the enclosure.

3. The animal toilet of claim 2 wherein the means for introducing cleansing liquid into the enclosure includes pipes having openings for introduction of the cleansing liquid into the enclosure.

4. The animal toilet of claim 1 further comprising drain means extending from said floor means drain opening.

5. The animal toilet of claim 4 wherein said drain means further comprises a valve for regulating fluid flow through said drain means.

6. The animal toilet of claim 5 wherein said drain means extends from said floor means drain opening to a conventional toilet.

7. The animal toilet of claim 5 wherein said drain means extends from said floor means drain opening to a bathtub.

* * * * *